United States Patent

[11] 3,601,381

| [72] | Inventor | Donald Beggs<br>Toledo, Ohio |
|---|---|---|
| [21] | Appl. No. | 824,849 |
| [22] | Filed | May 15, 1969 |
| [45] | Patented | Aug. 24, 1971 |
| [73] | Assignee | Midland-Ross Corporation<br>Toledo, Ohio |

[54] GAS SAMPLING DEVICE
3 Claims, 1 Drawing Fig.

| [52] | U.S. Cl. | 266/29,<br>266/15, 75/34 |
|---|---|---|
| [51] | Int. Cl. | F27d 23/00 |
| [50] | Field of Search | 266/15, 17,<br>24, 25, 29; 75/34 |

[56] References Cited
UNITED STATES PATENTS

| 2,670,946 | 3/1954 | Royster | 266/25 |
|---|---|---|---|
| 2,676,095 | 4/1954 | DeVaney et al. | 266/25 |
| 3,220,825 | 11/1965 | Swain | 266/25 |

Primary Examiner—Gerald A. Dost
Attorneys—Peter Vrahotes and Harold F. Mensing

ABSTRACT: This disclosure is directed to a gas sampler useful in apparatus for the direct reduction of iron oxide to metallic iron such as a vertical shaft type furnace employing a gaseous reductant. A novel arrangement of gas sampling is employed which enables the degree of reduction being achieved to be determined and controlled, in situ, by gas analysis.

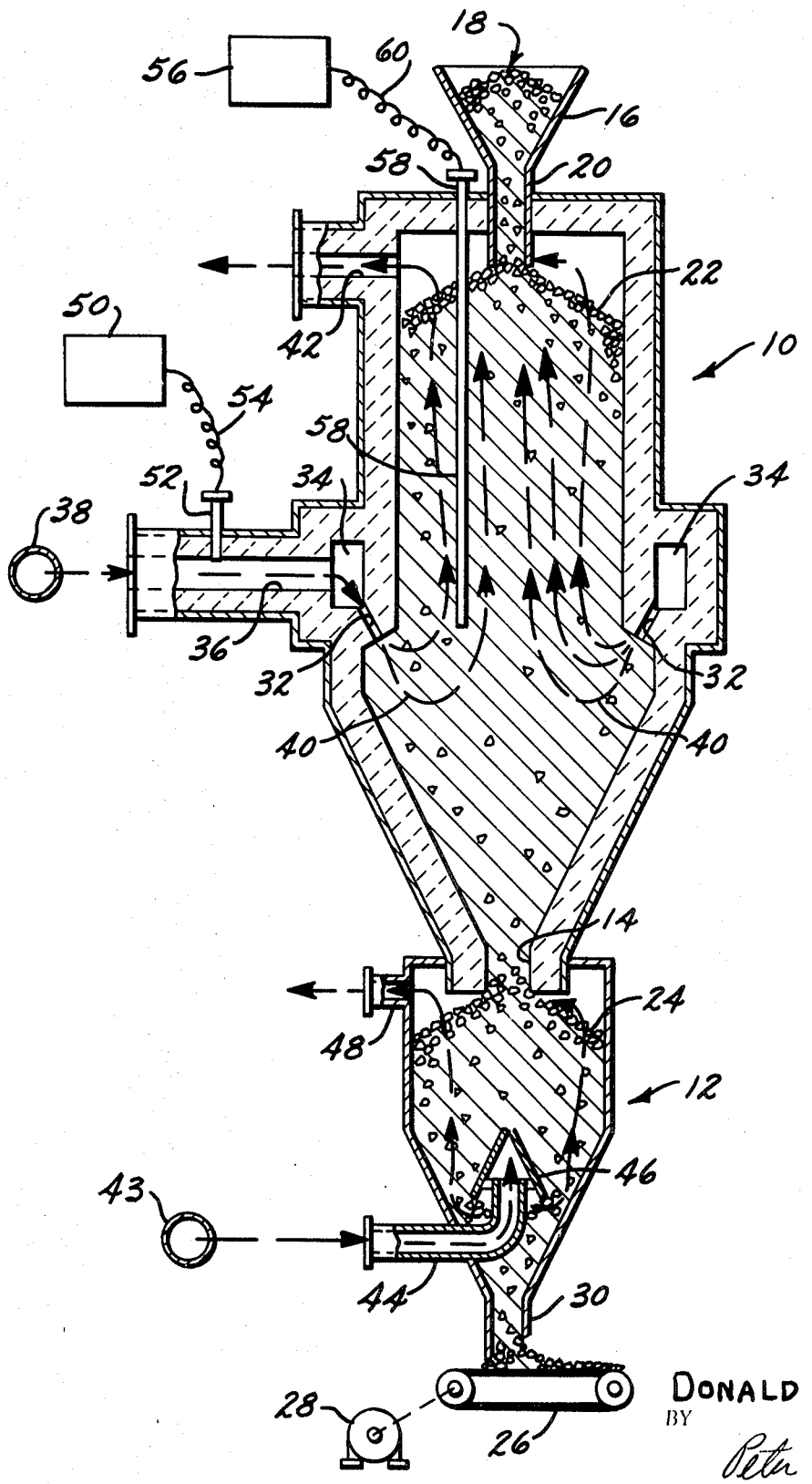

GAS SAMPLING DEVICE

In the field of direct reduction of iron oxide pellets, or lump ore, to metallic iron in the solid state utilizing gaseous reductant, the type of reduction furnace that has been most commonly employed is a vertical shaft furnace with a gravitationally descending burden of pellets or lumps. Hot reducing gas is introduced into a lower region and reacted off-gas is withdrawn from an upper region of the furnace burden to effect a counterflow gas-solids relationship in the reduction zone of the furnace. The hot reducing gas serves to heat the burden as well as to reduce it to the metallic state. This arrangement is known in the art as a counterflow shaft gaseous reduction furnace.

To obtain, and maintain, a high degree of reduction of the iron oxide to metallic iron, such as is necessary for use of the pellets or lump, hereinafter referred to as burden, for subsequent direct melting in an electric arc or other type melting furnace, it is essential in a counterflow shaft gaseous reduction furnace to achieve a high degree of reduction before the burden leaves the reduction zone. This presents an inherent operating problem in the reduction furnace in that the burden cannot in any practical manner be analyzed for degree of reduction until after it is discharged from the reduction furnace. To avoid having periods of operation wherein the degree of reduction is lower than is desired, it has been common practice in the art to employ an excess flow of reducing gas to insure reduction at all times. This practice results in a thermal inefficiency in the utilization of reducing gas which adversely affects the economics of the reduction operation.

In the present invention, a novel means has been conceived for determining the degree of reduction of the pellets or lumps immediately prior to their leaving the reduction zone, while they are still subject to further reduction before being withdrawn from the reduction zone of the furnace. The present invention enables a counterflow shaft gaseous reduction furnace to be operated at the minimum essential flow of reducing gas and with accompanying maximum thermal efficiency of utilization of reducing gas, while achieving continuity of the desired degree of reduction.

In the drawing, having but a single FIGURE, a cross-sectional view is shown of a vertical shaft furnace which incorporates the principles of the instant invention.

Referring to the drawing, a refractory lined shaft type reduction furnace is shown generally at 10 coupled to a shaft type cooler 12 by a throat 14 which permits the burden to descend from the reduction furnace into the cooler.

Reduction furnace 10 is equipped with a feed hopper 16 which is fed iron oxide pellets, or lumps, from a source 18. A pellet feed pipe 20 supplies pellets to the reduction furnace 10 wherein a first stockline 22 is established by angle of repose of the pellets. The throat 14 serves to establish a second stockline 24 in cooler 12 by an angle of repose. A suitable pellet discharge feeder, such as a belt feeder assembly 26 driven by a motor 28, serves to withdraw pellets from cooler 12 through a discharge pipe 30. The discharge feeder 26 serves to establish a gravitationally descending burden of pellets in the cooler 12, in the reduction furnace 10, and in the feed hopper 16.

Hot reducing gas is introduced into the burden in reduction furnace 10 through a series of wall ports 32 fed by a gas distribution bustle 34 and an inlet pipe 36 which is supplied with hot reducing gas from a source 38. The hot reducing gas which is introduced into the burden through ports 32 is directed generally downwardly and distributed laterally, or horizontally, across the burden in a flow pattern indicated by the gas flow arrows 40 before flowing vertically upward in counterflow relationship to the descending burden. Although the gas 40 is directed generally downwardly, it will be appreciated that the gas has a horizontal component. Reacted reducing gas exits from the burden at stockline 22 and vents through an off-gas pipe 42.

An inert cooling gas, such as dehydrated products of combustion, from a source 43 is introduced into a lower region of the burden in the cooler 12 through a cooling gas inlet pipe 44 equipped with a suitable gas distributor cap 46. Spent cooling gas exits from the burden in the cooler at stockline 24 and vents through an offtake pipe 48. To conserve the amount of cooling gas required from source 43, an external gas cooling system, not shown, may be employed to recirculate gas from offtake pipe 48 through a suitable water cooled gas cooler and through a blower which discharges the externally cooled gas back into inlet pipe 44. The cooler 12 has been described as a shaft type cooler, and it will be understood that any type cooler may be employed which will adequately cool the burden before it is exposed to air at the discharge feeder 26. In the circumstance where it may be desired to utilize the reduced pellets without resorting to cooling, it will be understood that a suitable discharge feeder adapted to handle hot material could be utilized to withdraw pellets at the throat 14.

The reduction furnace 10 is equipped with a gas analyzer 50 arranged to sample the reducing gas in pipe 36 through a gas sample connection 52 and suitable tubing 54. The reduction furnace 10 is also equipped with a gas analyzer 56 arranged to sample gas from within the burden through a burden gas sample pipe 58 located within the furnace 10 and suitable tubing 10. The burden gas sample pipe 58 is open at its lower end in order to sample gas from within the burden at substantially the elevation of, or somewhat below, the elevation of the gas ports 32, and to sample gas which has traversed part way through the burden in a generally lateral or horizontal direction, for reasons to be hereinafter discussed.

The gas analyzers 50 and 56 are both utilized to sample one of the constituents in the reducing gas, such as $CO_2$, for reasons to be hereinafter discussed.

In a counterflow shaft gaseous reduction furnace, such as has been generally described with reference to the drawing, the reducing gas which serves booth to heat the burden and to reduce iron oxide to metallic iron will generally contain $CO$ and $H_2$ as reducing constituents with lesser amounts of $CO_2$ and $H_2O$, which are oxidizing constituents. $CO$ and $H_2$ will react with iron oxide at elevated temperatures to form $CO_2$ and $H_2O$ and metallic iron, by well-known reduction reactions. For an efficient reduction operation, the hot reducing gas ought to contain a volume percentage of $CO+H_2$ at least about 10 times the volume percentage of $CO_2+H_2O$. Such reducing gas can be produced by reforming a hydrocarbon such as natural gas. In reducing iron oxide to metallic iron under counterflow gas-solids conditions, the reacted reducing gas exiting from the burden will have a volume percentage of $CO+H_2$ which is only about 2 times the volume percentage of $CO_2+H_2O$. In other words, a high percentage of the $CO+H_2$ in the reducing gas will react to form $CO_2+H_2O$ while reducing the iron oxide to metallic iron.

When hot reducing gas is brought into contact with metallic iron containing no iron oxide, there is no reaction of $CO$ and $H_2$ to form $CO_2$ and $H_2O$. In other words, the volume percentage of $CO+H_2$ and $CO_2+H_2O$ in the reducing gas remains unchanged when the gas is brought into contact with metallic iron at elevated temperatures.

Referring again to the drawing, to achieve efficient counterflow reduction of the iron oxide to metallic iron in the reduction furnace 10, the reduction must be substantially complete at about the elevation of the ports 32, which is the region where the gas flow is counterflow to the descent of the burden. The region below the ports 32, where the gas is distributing generally laterally within the burden, does not provide efficient reduction as compared to the counterflow region above the ports.

To provide for the most efficient operation of reduction furnace 10, and to guard against producing pellets, or lumps, which are not substantially completely reduced, the gas analyzer 56 is utilized to analyze the gas from burden gas sample pipe 58, and this analysis is compared to that being analyzed by gas analyzer 50 which is sampling the reducing gas in pipe 36. When the burden is substantially completely reduced at the elevation of the ports 32, the gas which distributes generally laterally within the burden will not react in traveling from the ports to the sample pipe 58. Under this condition, the analysis of the gas from sample pipe 58 will be substantially the same as the analysis of the reducing gas from sample connection 52. On the other hand, when the burden is not substantially completely reduced at the elevation of ports 32, the gas which distributes generally laterally within the burden will react while traveling from the ports 32 to the gas sample pipe 58. Under this condition, the analysis of the gas from gas sample pipe 44 will show a decrease in $CO+H_2$ and an increase in $CO_2+H_2O$ as compared to that of the reducing gas. From a practical operating standpoint, it is preferable to have gas analyzers 50 and 56 analyze for $CO_2$ or $H_2O$ since these are minor constituents of the reducing gas, and any change in analysis between sample connection 52 and sample pipe 58 will be a greater proportional change than that of the CO and $H_2$ content. When the burden is not completely reduced at the elevation of the ports 32, it would be necessary to increase the relative flow of reducing gas to solids. This may be accomplished by either reducing the flow of burden through the furnace 10 or increasing the flow of reducing gas from the ports 32.

For optimum efficiency of operation and productivity, it is preferred to maintain a flow rate of iron oxide relative to hot reducing gas such that there is a slight increase in $CO_2$ or $H_2O$ content in the gas from sample pipe 58 over that from sample connection 52. Operation with this slight increase in $CO_2$ or $H_2O$ content will insure maximum productivity with an accompanying high degree of reduction. It will be understood that gas analyzers 50 and 56 can be incorporated into an automatic control system to actuate the speed of motor 28 relative to the flow of reducing gas from source 38, or vice versa.

Although only a single embodiment of the invention has been shown and described, it is understood that changes and modifications can be made therein, and this description is illustrative only and not for the purpose of rendering this invention limited to the details illustrated or described except insofar as they are limited by the terms of the following claims.

I claim:

1. In a shaft furnace having a housing, means for feeding oxide particulate material at the upper portion of said housing and means for discharging the particulate material at the bottom of the housing, thereby establishing a gravitational flow of the materials, and means for removing gas from said housing at the upper end, the improvement comprising introducing a reducing gas into said housing in a generally downwardly direction and at a location below the gas outlet, thereby establishing a gas-solids counterflow, means for removing a portion of said gas at a location in general horizontal alignment with said gas inlet means, means for measuring the composition of said gas portion, and means for changing the relative flow of gas to solids through the housing.

2. The furnace of claim 1 wherein said changing means is responsive to said measuring means.

3. An apparatus for indicating the degree of reduction of oxide particles during the reduction of said particles in a gaseous reduction process, said apparatus comprising: a furnace having an inlet and an outlet for said particles, means for introducing said particles into said inlet, means for causing said particles to flow in a stream through said furnace towards said outlet, means for introducing a reducing gas downstream from said inlet, means for producing a counterflow of said gas through said particle stream, intake means for withdrawing a sample of said reducing gas from a location along the stream where the particles should be substantially reduced, said intake means being spaced laterally across said particle stream a substantial distance from said gas introducing means such that said gas must pass through at least a portion of said stream before entering said intake, and means to indicate the relative amounts of one of the constituents of said reducing gas prior to its introduction into said furnace and also in said sample.